US005136634A

United States Patent [19]

Rae et al.

[11] Patent Number: 5,136,634

[45] Date of Patent: Aug. 4, 1992

[54] VOICE OPERATED FACSIMILE MACHINE NETWORK

[75] Inventors: David C. Rae; Timothy Farlow, both of Naples, Fla.; Donald G. Leckrone, Woodstock, Ga.

[73] Assignee: SpectraFAX Corp., Naples, Fla.

[21] Appl. No.: 480,463

[22] Filed: Feb. 15, 1990

Related U.S. Application Data

[63] Continuation-in-part of Ser. No. 321,715, Mar. 10, 1989.

[51] Int. Cl.[5] ........................ H04M 11/00; H04N 1/32

[52] U.S. Cl. ........................ 379/100; 379/94; 379/88; 358/402; 358/403; 358/407; 358/435; 370/110.1

[58] Field of Search ........................ 379/94, 88, 284, 90, 379/91, 96–98, 100; 370/94.1, 94.3, 85.1, 85.15, 110.1; 340/825.06; 358/400, 402, 403, 405, 407, 434–436, 438, 443, 442

[56] References Cited

U.S. PATENT DOCUMENTS

| | | | |
|---|---|---|---|
| 4,255,619 | 3/1981 | Saito | 379/96 |
| 4,866,758 | 9/1989 | Heinzelmann | 379/94 |
| 4,914,586 | 4/1990 | Swinehart et al. | 379/94 |
| 4,974,254 | 11/1990 | Perine et al. | 379/100 |

FOREIGN PATENT DOCUMENTS

| | | | |
|---|---|---|---|
| 0236803 | 9/1987 | European Pat. Off. | 379/284 |
| 0012657 | 1/1989 | Japan | 379/100 |
| 2211698 | 7/1989 | United Kingdom | 379/98 |

OTHER PUBLICATIONS

Anonymous, "Document Distribution System", *International Technology Disclosures,* May 25, 1988, p. 2, vol. 6, No. 5.

A. Boleda et al., "PBX/LAN" Telesis 1985 two, pp. 27–33, 2nd Quarter 1985.

H. Wurzburg et al., "PBX-Based Lans: Lower Cost Per Terminal Connection", *Computer Design,* Feb. 1984, pp. 191–199.

A. Torino, "Lan's-Partners with Voice/Data Systems", *Telecommunications,* Sep. 1984, pp. 64g–64k, 64p.

*Primary Examiner*—Jin F. Ng
*Assistant Examiner*—Wing F. Chan
*Attorney, Agent, or Firm*—Rothwell, Figg, Ernst & Kurz

[57] ABSTRACT

A method and apparatus for transmitting specifically requested graphic and/or textual data from an unattended database storage location to a requestor's facsimile machine over a telephone line includes a host computer such as a PC modified with a facsimile transmission board and a voice generation board. The host computer receives incoming phone calls and prompts the caller using the voice board to select data files by using the DTMF keys of a standard telephone handset. The PC can be left unattended and can run automatically in the facsimile transmission mode. Callers can immediately access needed textual and image data with the use of just a standard telephone and facsimile machine. Multiple workstation nodes can be configured in a network setup to handle a high volume of calls in real time and to allow multiple data services to operate simultaneously.

13 Claims, 15 Drawing Sheets

71 CONSOLE
72
73 SERVER
NODE STRING NET
75 NODE 1
PHONE NET
NODE 2 75
NODE 3 75
NODE 4 75
NODE n 75
77
PUBLIC SWITCHED TELEPHONE NETWORK

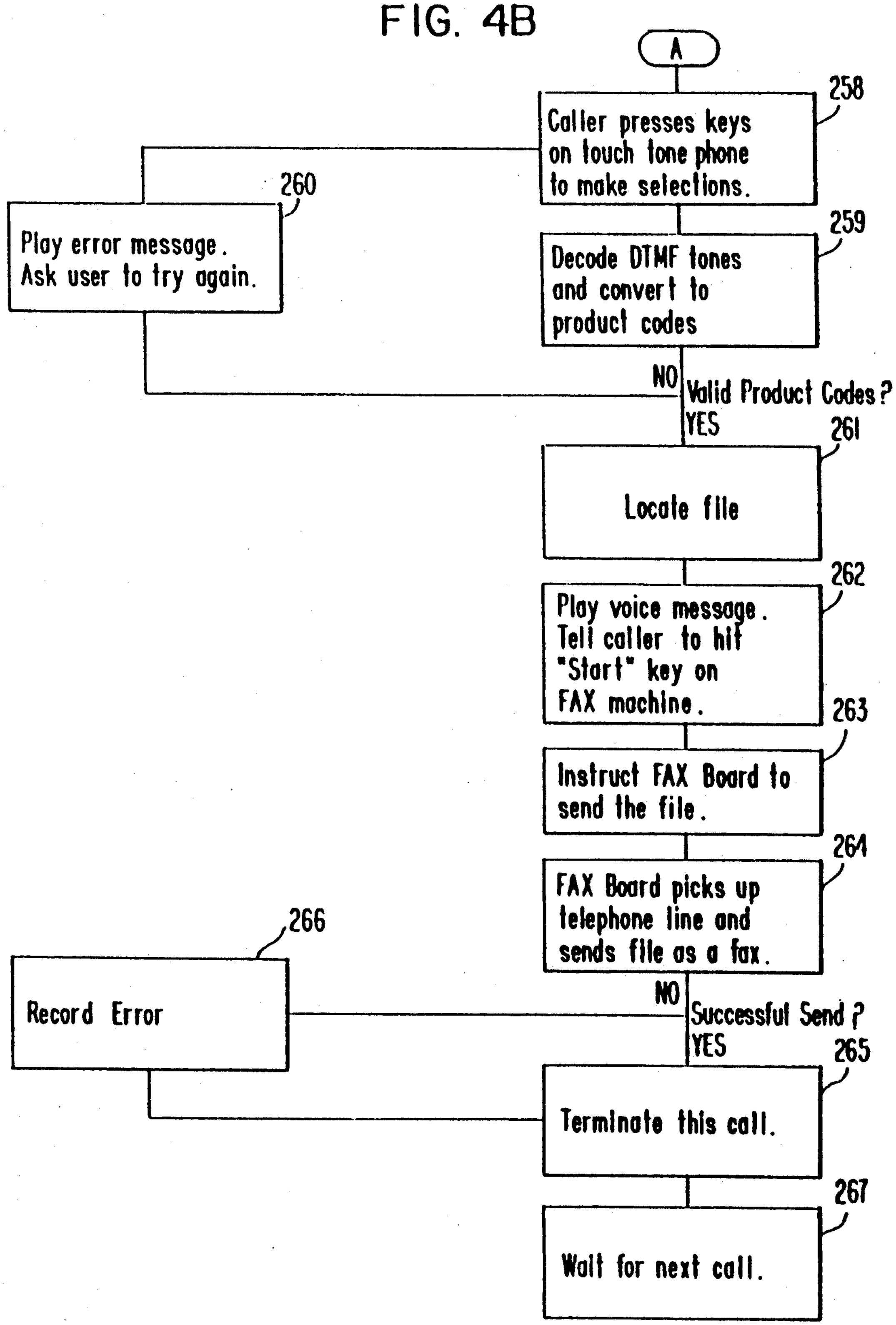
FIG. 4B
A
258
Caller presses keys on touch tone phone to make selections.
260
Play error message. Ask user to try again.
259
Decode DTMF tones and convert to product codes
NO
Valid Product Codes?
YES
261
Locate file
262
Play voice message. Tell caller to hit "Start" key on FAX machine.
263
Instruct FAX Board to send the file.
264
FAX Board picks up telephone line and sends file as a fax.
266
Record Error
NO
Successful Send?
YES
265
Terminate this call.
267
Wait for next call.

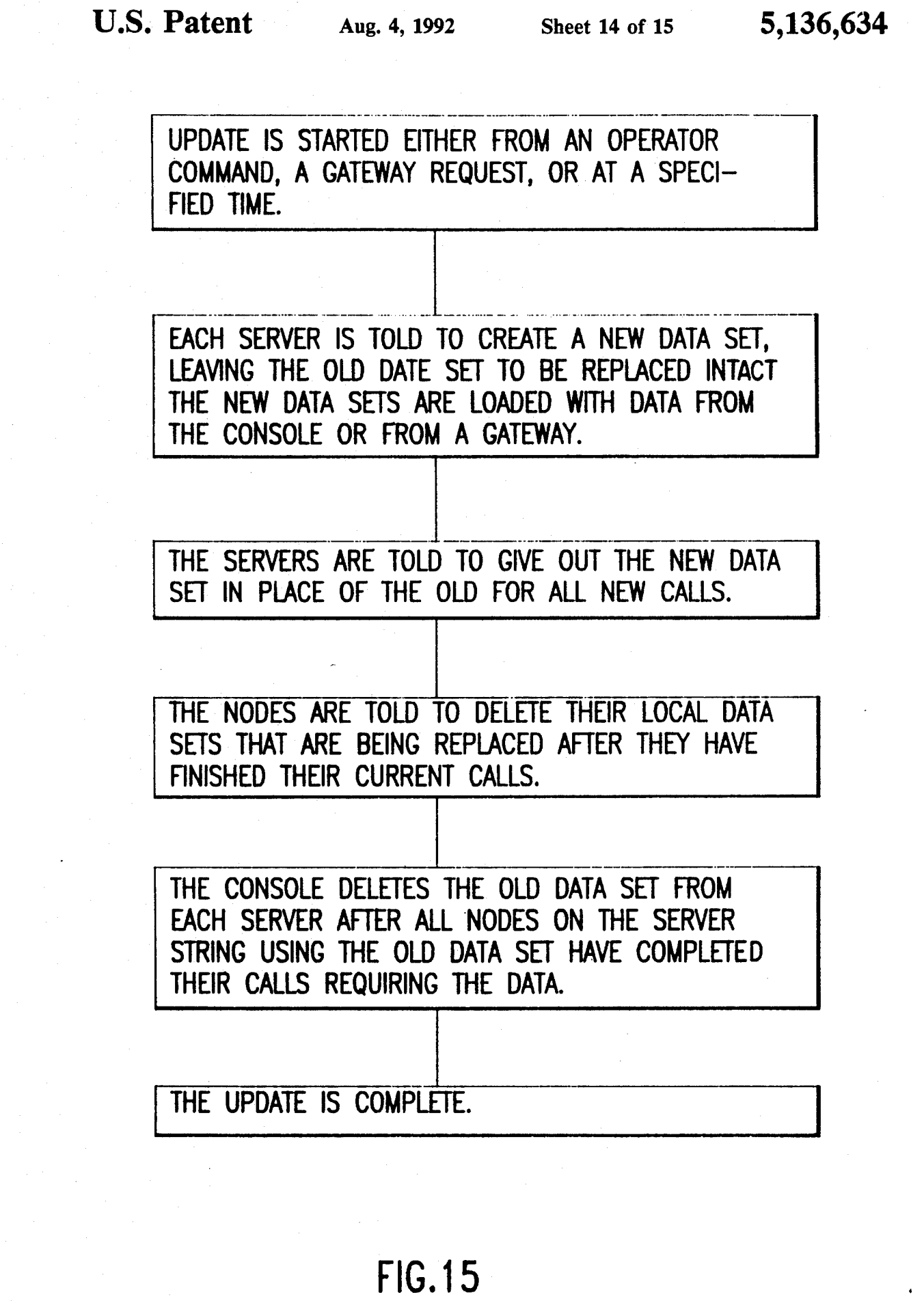

UPDATE IS STARTED EITHER FROM AN OPERATOR COMMAND, A GATEWAY REQUEST, OR AT A SPECIFIED TIME.

EACH SERVER IS TOLD TO CREATE A NEW DATA SET, LEAVING THE OLD DATE SET TO BE REPLACED INTACT THE NEW DATA SETS ARE LOADED WITH DATA FROM THE CONSOLE OR FROM A GATEWAY.

THE SERVERS ARE TOLD TO GIVE OUT THE NEW DATA SET IN PLACE OF THE OLD FOR ALL NEW CALLS.

THE NODES ARE TOLD TO DELETE THEIR LOCAL DATA SETS THAT ARE BEING REPLACED AFTER THEY HAVE FINISHED THEIR CURRENT CALLS.

THE CONSOLE DELETES THE OLD DATA SET FROM EACH SERVER AFTER ALL NODES ON THE SERVER STRING USING THE OLD DATA SET HAVE COMPLETED THEIR CALLS REQUIRING THE DATA.

THE UPDATE IS COMPLETE.

FIG.15

VOICE OPERATED FACSIMILE MACHINE NETWORK

CROSS-REFERENCE TO RELATED APPLICATION

This application is a continuation-in-part of Ser. No. 07/321,715 filed Mar. 10, 1989.

FIELD OF THE INVENTION

The present invention relates generally to database acquisition systems in which a user can access data stored in a storage medium via a telephone line.

BACKGROUND OF THE INVENTION

Various data accessing systems are known in the art in which users can retrieve requested data from a central data storage location through telephone lines. Conventionally, subscribers to such systems are required to have either a personal computer (PC) or a so-called "smart terminal" in order to receive data from the central data location. A smart terminal usually consists of a keyboard and a display device containing a microprocessor for providing local control of the operation of the terminal.

Also generally known is the use of a conventional dual tone multi-frequency (DTMF) telephone to communicate with a remote database computer in which a user utilizes the alpha-numeric keys of the telephone to communicate a request to the database which then provides an audible response to the telephone receiver as voice information.

While currently available database accessing systems allow a restricted amount of information to be communicated to a user through a conventional telephone and allow subscribers with relatively sophisticated and expensive equipment to gain access to larger databases at considerable cost, the prior art has failed to address the communication needs of individuals to acquire automatic and quick user selective forms of textual and/or graphic image data from an unattended database location, without the necessity of relatively expensive and sophisticated terminal equipment.

SUMMARY OF THE INVENTION

This invention provides, in a first embodiment, apparatus for enabling a user to acquire specifically requested data from an unattended database storage location without the need for costly equipment.

This invention also enables a user to obtain graphic image data automatically from an unattended database location on a substantially real time basis.

This invention provides an apparatus for transmitting graphic and/or textual data requested by a user to a facsimile machine of the user over the telephone line, comprising a host computer including a memory means for storing the graphic and textual data, means for receiving an incoming call from the user over the telephone line, voice generation means for generating voice signals over the telephone line to the user, the voice signals representing instructions informing the user of individual items of data in the memory means which can be selected by the user for transmission, and instructions informing the user of specific code signals associated with each item of data, means for receiving code signals from the user over the telephone line representing selected items of data, means for decoding the received code signals to identify the selected items of data, means for retrieving the identified items of data from the memory means, means for transmitting the retrieved data in facsimile form to the facsimile machine, and means for terminating the incoming call after completion of the facsimile transmission.

In a second embodiment, the present invention provides apparatus for transmitting graphic and/or textual data requested by a plurality of users to respective facsimile machines of said users over public telephone lines, comprising a plurality of nodes interconnected in a node string network configuration, each node including means for receiving an incoming call from a user over said telephone lines, voice generation means for generating voice signals over said telephone lines to said user, said voice signals representing instructions informing said user of individual items of data which can be selected by said user for transmission, and instructions informing said user of specific code signals associated with each of said individual items of data, means for receiving code signals from said user over said telephone lines representing selected items of data, means for decoding said received code signals to identify said selected items of data, means for retrieving said identified items of data, means for transmitting said retrieved data in facsimile form to said user's facsimile machine, and means for terminating the incoming call after completion of the facsimile transmission; node string network server means connected to the node string network for storing voice signal data used by the voice generation means, graphic and textual data retrieved by the means for retrieving, and instruction data for controlling the operation of each of said nodes, and console means interconnected with the plurality of nodes for monitoring the status of each of the nodes, and identifying and disabling malfunctioning nodes.

The present invention thus enables a user to obtain graphic and/or textual data from a remote database using only a telephone and a standard facsimile machine, and provides a large scale system for accommodating large numbers of users simultaneously on a real time basis.

Further scope of applicability of the present invention will become apparent from the detailed description given hereinafter. However, it should be understood that the detailed description and specific examples, while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein:

FIGS. 4A and 4B are flow charts illustrating a main processing routine of the computer 200 of FIG. 1, according to the present invention;

FIGS. 11-18 are flow charts explaining various processing and control algorithms of the embodiments of FIGS. 7, 8 and 10.

DESCRIPTION OF THE PREFERRED EMBODIMENTS

Figure 1:
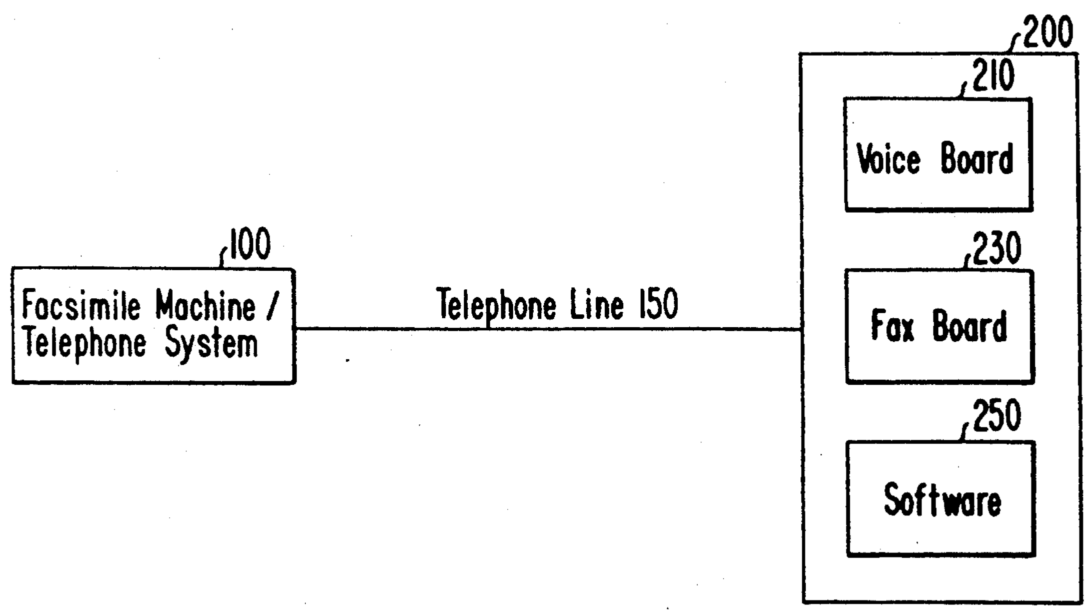
FIG. 1 is a block diagram of one preferred embodiment of the present invention.

FIG. 1 illustrates the overall configuration of a system in conjunction with one preferred embodiment of the present invention in which a user's facsimile machine/telephone system 100 is interconnected to an unattended database storage location 200, which may be a computer or another type of data storage device, over a telephone line 150. The telephone line is preferably a portion of a public switched telephone network (PSTN) so that the facsimile machine/telephone system 100 may call the computer 200.

The computer 200 (which may be a minicomputer, personal computer or other suitable computer) is equipped with a voice board 210 and a fax board 230 and is loaded with specific software 250 to operate the system in the database acquisition mode described hereinbelow. Alternatively, the voice and fax capabilities could be implemented with DSP (Digital Signal Processing) chips in the motherboard of the computer.

Figure 2:
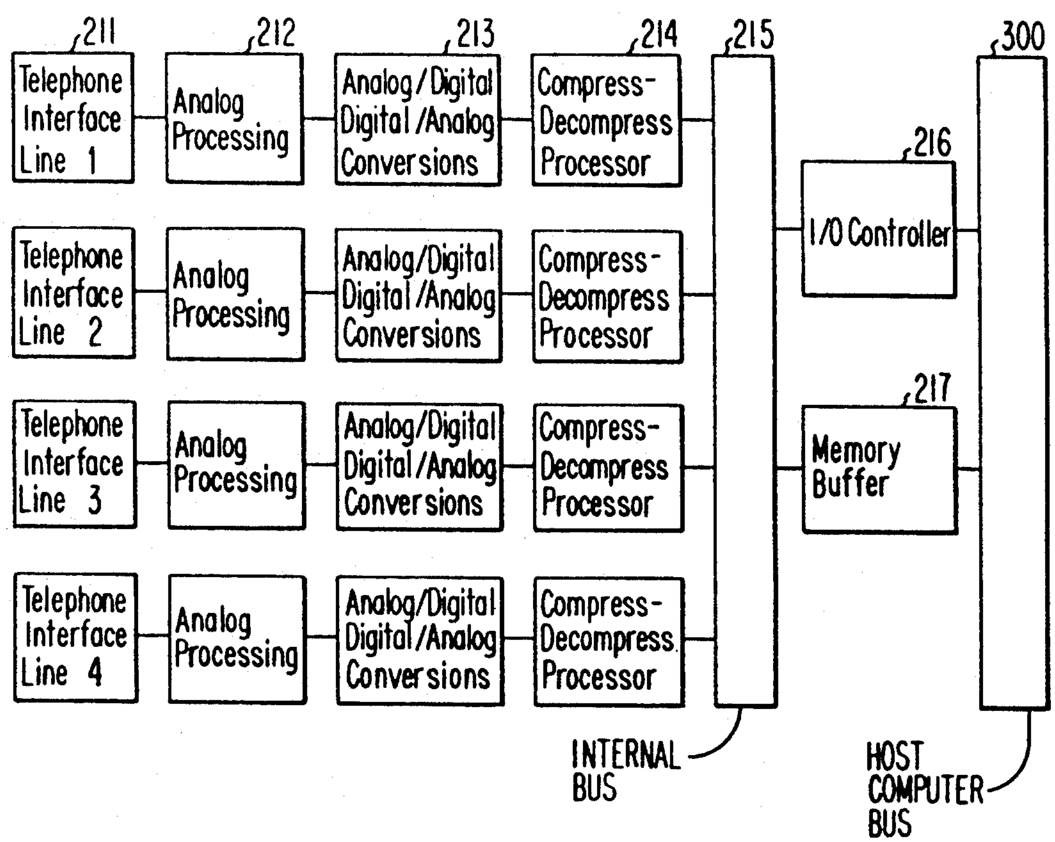
FIG. 2 is a schematic block diagram for illustrating the configuration of one embodiment of a voice board 210 of FIG. 1.

A schematic block diagram of voice board 210 is illustrated in FIG. 2. The voice board is an integrated circuit module which is placed into a standard I/0 slot of the PC to interconnect with the PC's data and control buses. Such voice board are commercially available devices, such as Model D-40 B from Dialogic Corporation, for example. However, other equivalent voice boards may be used for purposes of the present invention.

The typical layout of a four line voice board consists of a plurality of telephone interface lines 211 which connect with outside callers, analog processing circuits 212 connected to the telephone interface 211, A/D - D/A converter circuits 213 connected to the analog processing circuits 212, and compressor-decompressor circuitry 214 connected to the digital/analog converters 213. The compressor-decompressors 214 are connected to an internal bus 215 of the voice board which is connected to I/0 controller 216 and a memory buffer 217. The I/P controller 216 and memory buffer 217 are further connected to the personal computer bus 300.

The operation of the voice board is as follows. A plurality of voice messages are stored in a memory as compressed digital voice data. The compressed voice data is obtained by having an announcer speak into a telephone device connected to a telephone interface line 211, processing the resultant analog waveform in the processing circuit 212, converting the processed analog signal into a digital signal in the analog-to digital part of the converter 213, compressing the digital data in the circuit 214, and storing the compressed data in memory via the input/output controller 216 and the internal bus 215. A voice message to be output is obtained from the memory, loaded into the memory buffer 217, and processed in the reverse order to output a voice analog signal at the telephone interface line 211 to be received by the speaker of a telephone handset.

Figure 3:
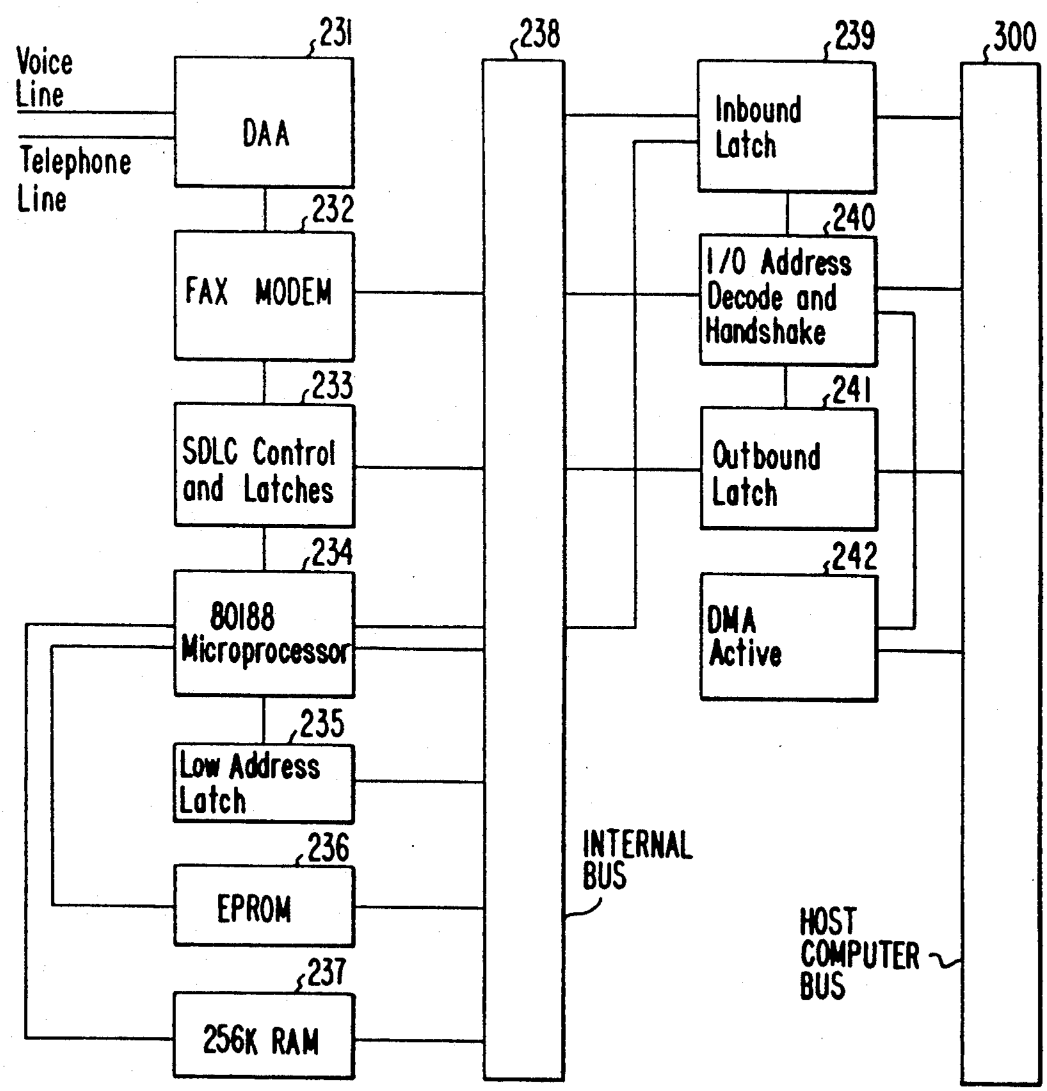
FIG 3 is a schematic block diagram of the configuration of one embodiment of the fax board 230 of FIG. 1.

FIG. 3 is a block diagram of the structure of the fax board of 230 of FIG. 1. The fax board may also be obtained as a commercially available unit, such as the "Connection Coprocessor" available from Intel Corporation, the "Personal Link" available from SpectraFax Corporation, or equivalent boards from other manufacturers.

The fax board 230 consists of a data access arrangement (DAA) device 231, a modem 232, an SDLC controller 233, a microprocessor 234, a low address latch 235, an EPROM 236, random access memory 237, an inbound latch 239, I/O address decoder 240, an outbound latch 241, and a direct memory access (DMA) controller 242. The various components of the board are interconnected via an internal bus 238, while the inbound and outbound latches, the DMA controller, and the I/O address decoder are connected to the host computer via the host computer bus 300.

The fax board is controlled by the host computer through a series of commands loaded into the inbound latch 239 from the host processor. The fax board receives DMA data from the host processor to send fax documents via the fax modem 232 to a telephone line connected to the DAA 231. Status and control data is communicated to the host processor via the outbound latch 241.

A description of the operation of the present invention will now be described with reference to FIGS. 4A, 4B, 5 and 6.

Figure 4A:
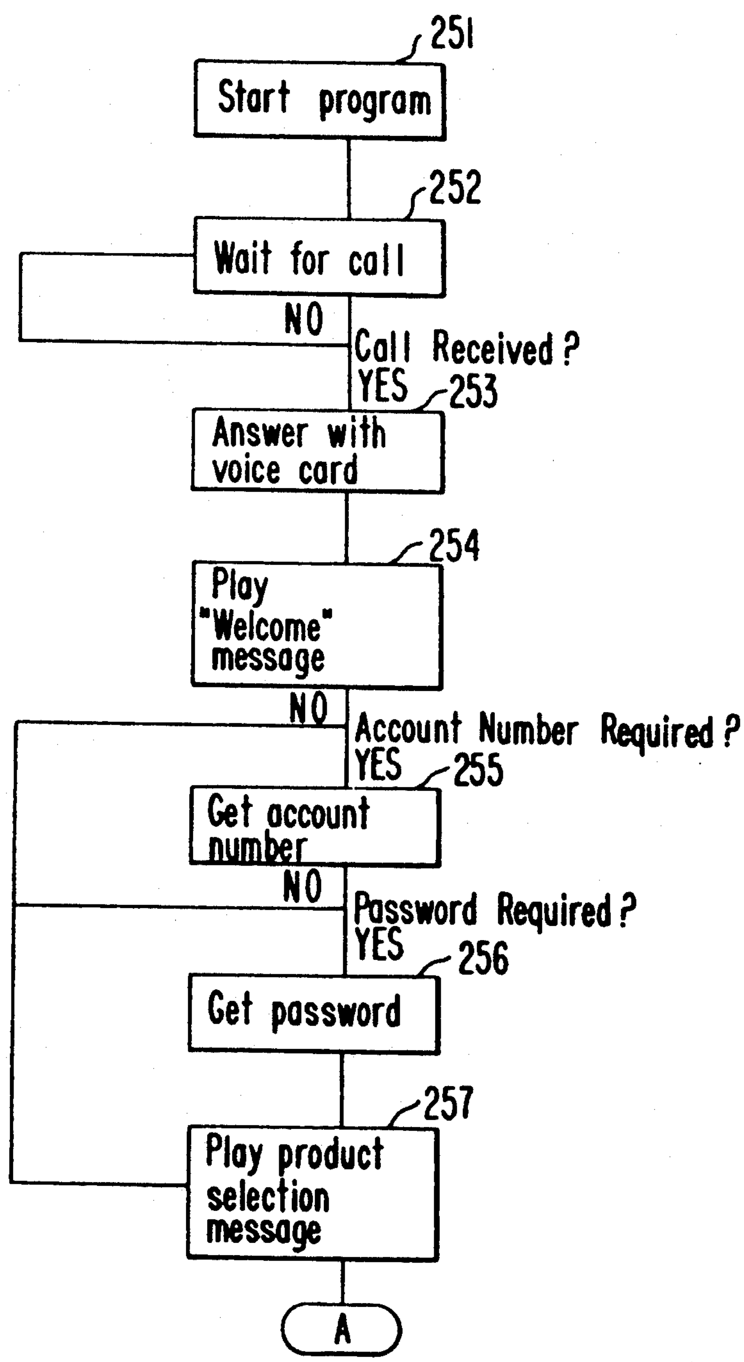
Figure 6:
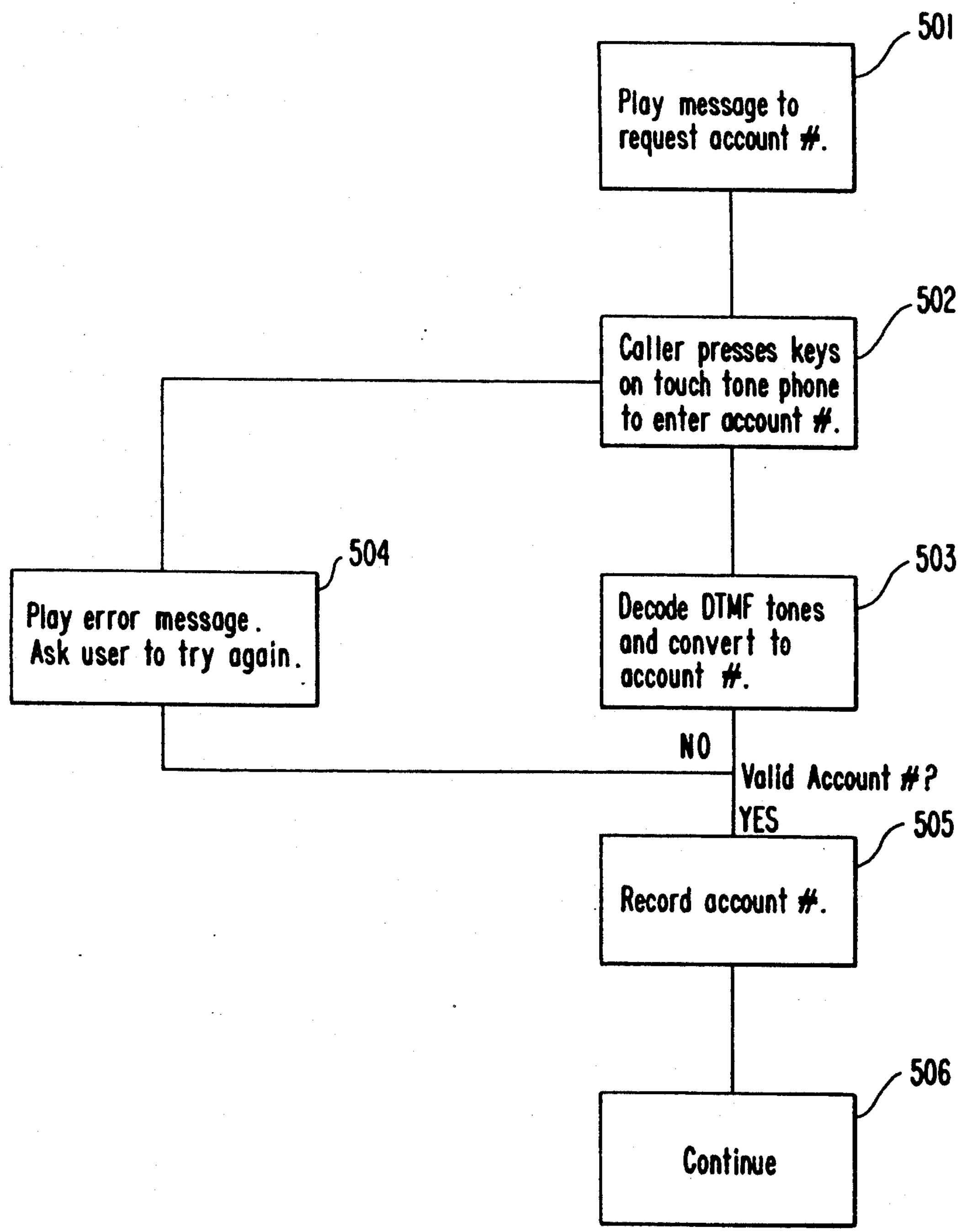
FIG. 6 is a flow chart illustrating a subroutine for obtaining a user's account number.

The main processing routine is illustrated in FIGS. 4A and 4B. At step 251, the main program is started by performing various initialization functions. At step 252, the host computer waits for an indication of an incoming call from the voice board. Upon the detection of the presence of an incoming call, the voice board is caused to output a welcome message at step 254. If an account number is required, processing advances to step 255, which initiates the account number subroutine as illustrated in FIG. 6.

Figure 5:
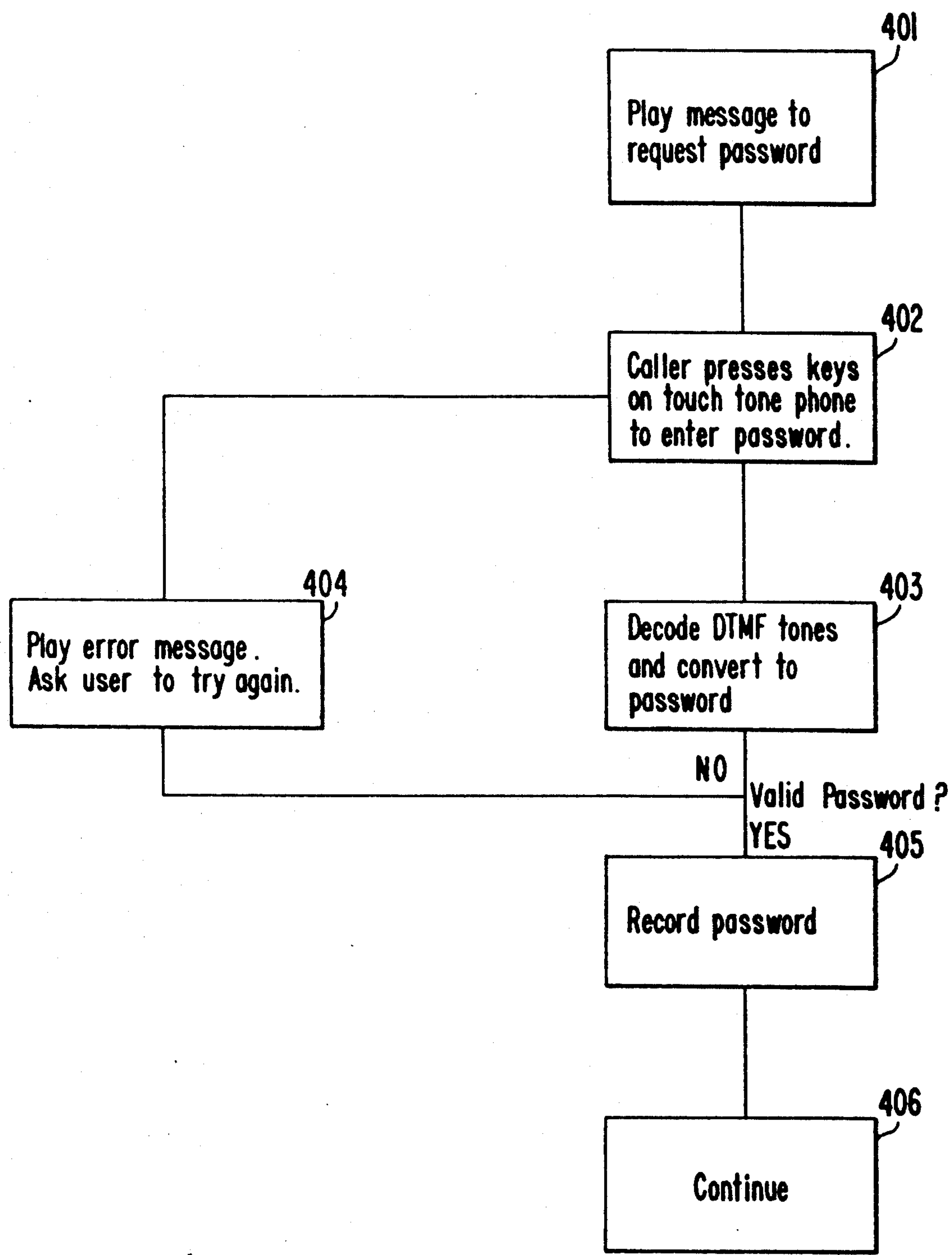
FIG. 5 is a flow chart illustrating a subroutine for obtaining a user's password.

In this subroutine, the voice board outputs a request for an account number at step 501. At step 502, the system waits for the input of DTMF signals representing the caller's account number. After the caller has inputted his account number, the DTMF signals are decoded and compared with a list of valid account numbers at step 503. If the account number is valid, it is recorded at step 505 for billing purposes and processing returns to the main routine at step 506. If the account number is not determined to be valid, the voice board outputs an error message and asks the user to try again at step 504, upon which the subroutine returns to step 502 to await the input of a new account number. If a password is then required, the main routine proceeds to step 256 which calls up the password subroutine as illustrated in FIG. 5.

In the password subroutine, the voice board is caused to output a message requesting the user to input a password at step 401. At step 402, the system waits for the caller to complete the input of DTMF signals representing the password. After completion of password input, the DTMF signals are converted to password data at step 403, and the decoded password is checked for validity. If the password is valid, it is recorded at step 405 and the subroutine transfers processing to the main routine at step 406. If the password was judged to be invalid, the voice board is caused to output an error message at step 404 and the subroutine returns to step 402 to await the inputting of another password.

After the caller has input a valid account number and password, the main routine advances to step 257 at which the voice board is caused to output instructions informing the caller of the different types and items of data which are available for transmission as a facsimile along with DTMF codes corresponding to each of the listed items of data. After the product selection message is complete, the voice board outputs a prompt signal prompting the caller to input the codes corresponding to the item of data that has been selected for reception at the caller's facsimile machine. The program proceeds to step 258 as illustrated in FIG. 4B.

At step 258, the system waits for the completion of code input from the caller. At step 259, the DTMF codes signals are converted to digital product codes and are checked for validity. Upon identification of a valid product code at step 259, the processing advances to step 261 in which the file containing the requested data is located for transfer to the fax board to be sent as a facsimile over the existing telephone connection. If the product code decoded at step 259 does not correspond to a valid data file, the program proceeds to step 260 which causes the voice board to output an error message requesting the caller to input another code and returns to step 258. At step 262, the voice board outputs a message instructing the caller to press the start key on his facsimile machine to place the machine on line in a ready state to receive a facsimile transmission. The program then advances to step 263 in which the fax board is instructed to send the identified file as a facsimile transmission. In an alternative embodiment, at step 262 the caller can be given the option to input the telephone number of an alternate facsimile machine to which the transmission should be directed.

At step 264, the telephone connection is transferred to the fax board which then transmits the data in the identified file in a facsimile format, after handshaking with the fax machine to determine the correct operating parameters, specifically, whether the machine is operating on Group II or Group III of the CCITT protocols. The transmission is then checked to determine whether a satisfactory send has occurred. If an error has been detected, the program proceeds to step 266 in which the error is recorded. Otherwise, the call is terminated by releasing the phone line connection at step 265. The system then resets to await the next call at step 267.

Figure 7:
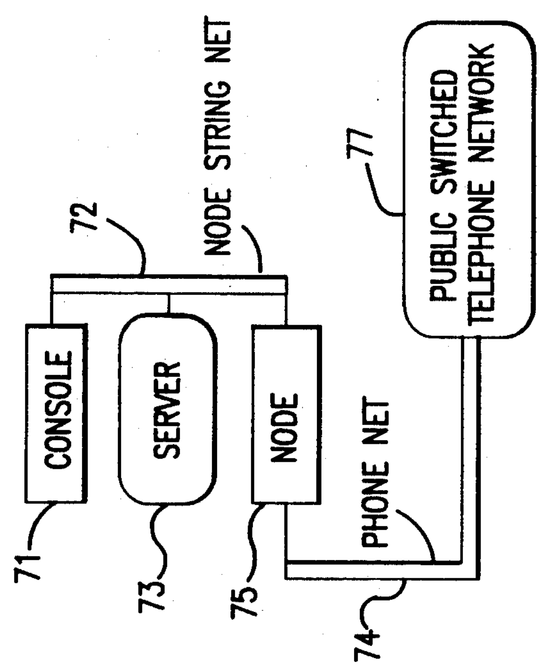
FIG. 7 is a block diagram of a second preferred embodiment of the present invention illustrating a network configuration.

FIG. 7 is a block diagram illustrating a second preferred embodiment of the present invention in which, instead of the stand-alone unit 200 illustrated in FIG. 1, a network configuration is provided in which monitoring and control is provided by a console 71, data and processing instruction storage is performed by a network server 73, and call handling, voice processing, and facsimile transmission are performed by a node 75 is connected to the public switched telephone network (PSTN) 77 via a phone network cable 74.

Each of the console 71, network server 73, and node 75 may be a personal computer, mini computer, or other suitable computer.

Figure 8:
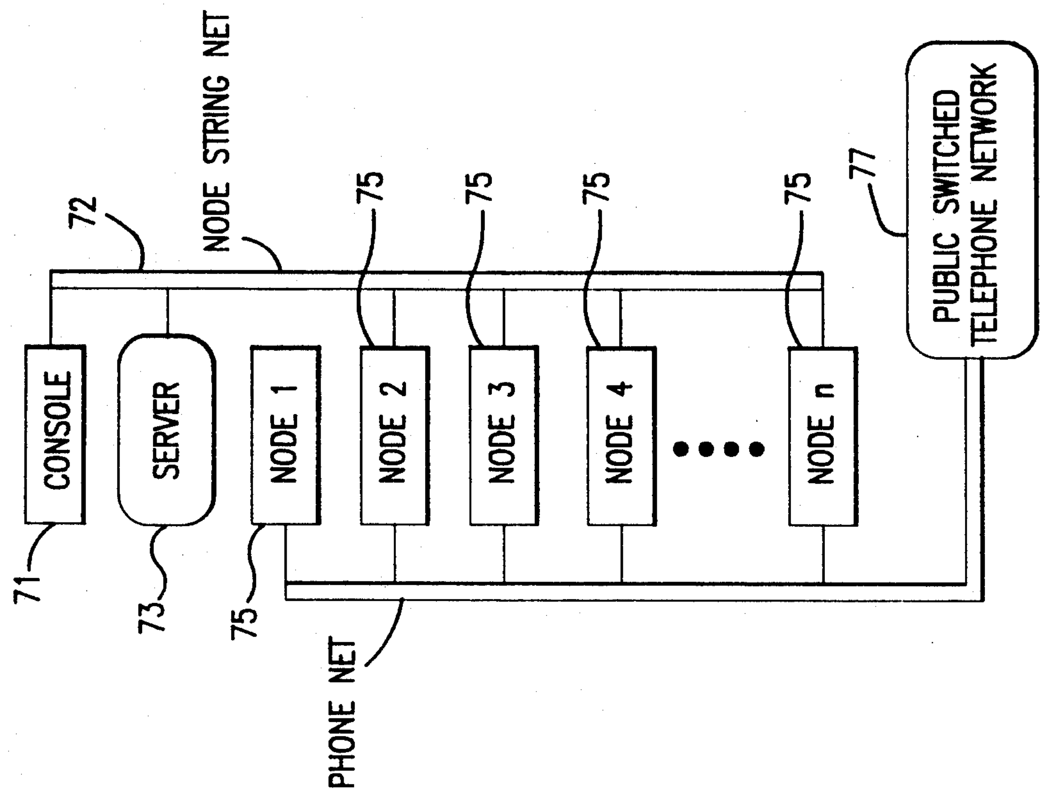
FIG. 8 is a block diagram illustrating a modification of the system of FIG. 7, in which a plurality of node work stations are employed.

FIG. 8 is a block diagram illustrating a modified version of the network system of FIG. 7 in which a number of node work stations are connected to the node string network 72 and the PSTN 77, to thereby enable more phone lines to be handled simultaneously.

Figure 9B:
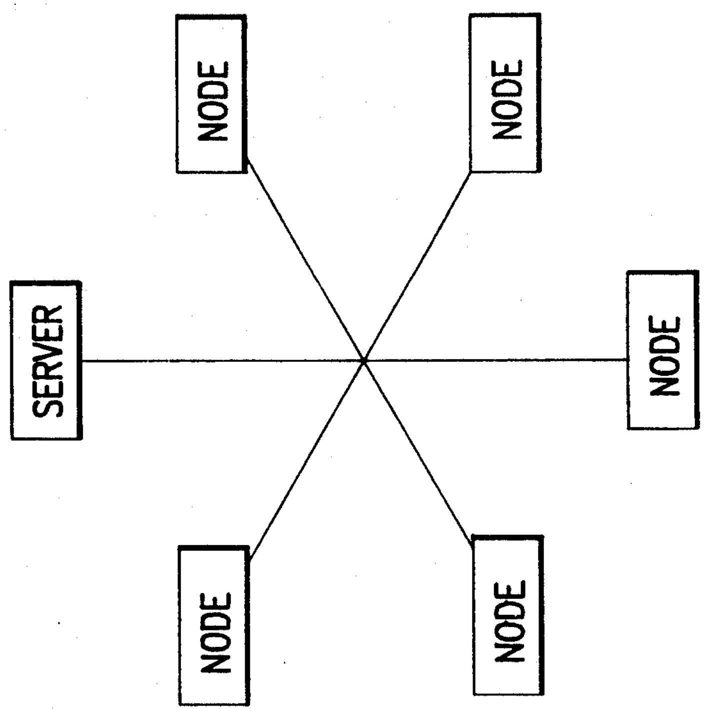
FIGS. 9A and 9B are block diagrams illustrating different types of local area network (LAN) topologies.
Figure 9A:
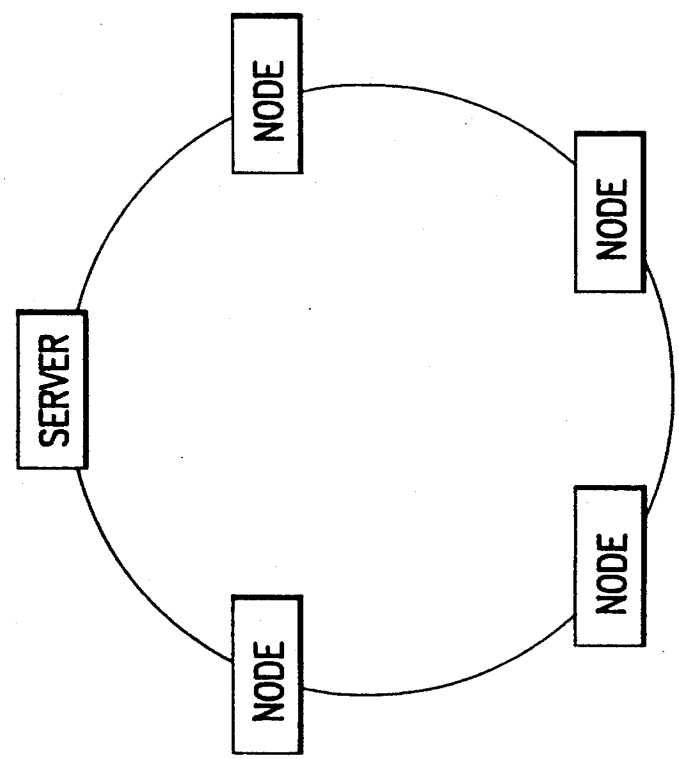

While the network embodiment of the present application is shown in a bus topology, other topologies are available which are equivalent to the bus topology. FIG. 9A illustrates a ring topology, and FIG. 9B illustrates a star topology which can be equivalently used in conjunction with the features of the present invention. The various network configurations are known as local area networks (LAN). LAN's are commercially available and are installable on many personal computers. Examples are IBM Token Ring, ARCNET and Ethernet.

Figure 10:
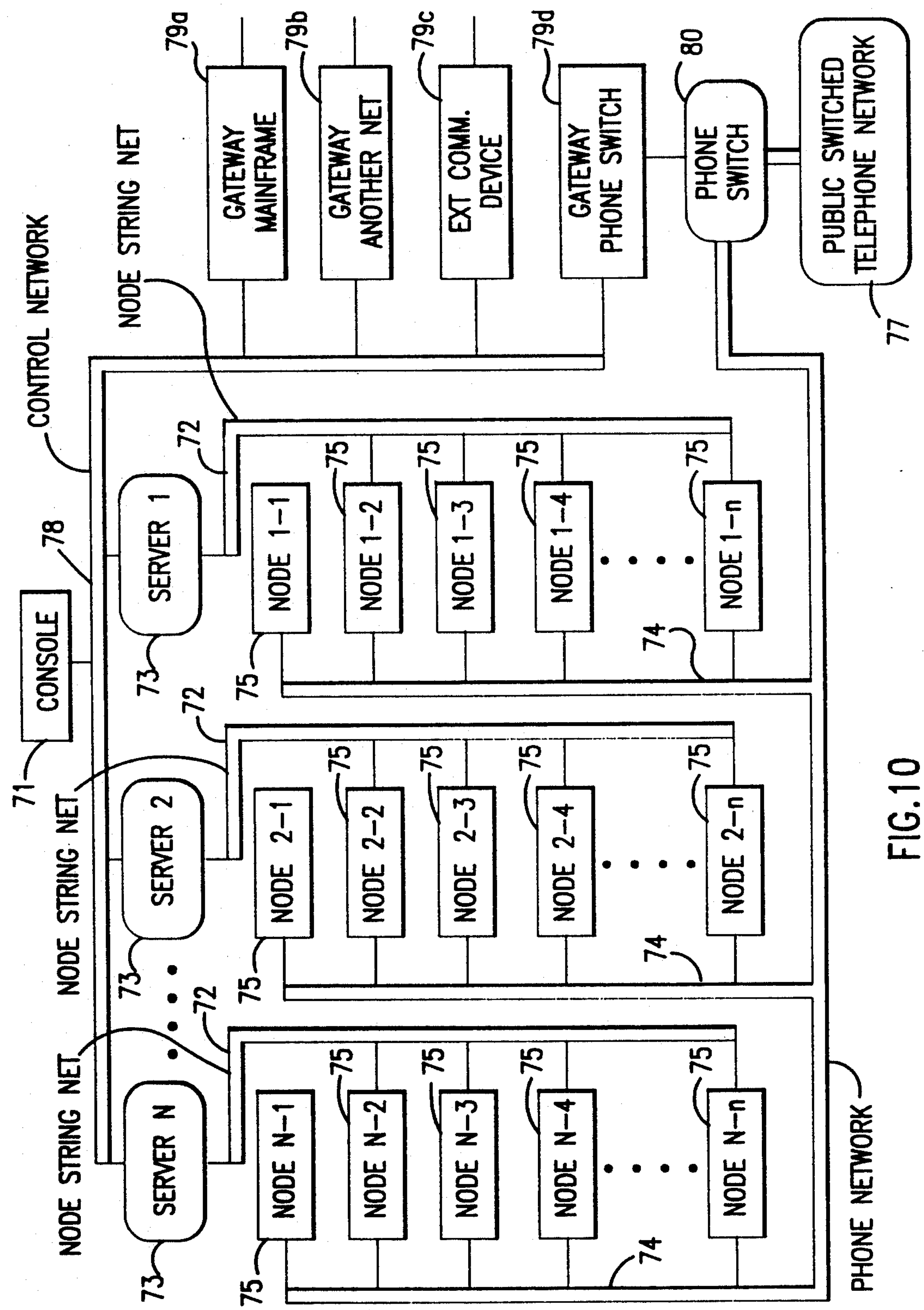
FIG. 10 is a block diagram illustrating a modification of the system of FIG. 8 in which a plurality of server work stations are interconnected to a console via a control network, to even further increase the capabilities of the system.

FIG. 10 is a block diagram of an expanded version of the network system of FIG. 8 in which a plurality of node string networks 72 are connected to a control network 78 via respective servers 73 which are in turn interconnected to the control console 71.

Also shown connected to the control network 78 are various gateway work stations 79*a*–79*d*. These work stations consist of a suitable computer similar to the configuration of the console, server and node, and which is fitted with communication hardware to link the LAN to another device or system. Such gateways are used to update the data stored on the system, including voice message data, processing algorithms, and graphic and textual facsimile data stored on the servers. The gateway may connect to a mainframe computer as illustrated by 79*a*, another network configuration as illustrated by gateway 79*b*, any other external communication device as illustrated by 79*c*, and may also connect to a phone switch 80 which allows the console 71 to direct incoming calls to particular node string networks as illustrated by 79*d*.

The processing algorithms, voice data and facsimile retrieval data are stored on each server for immediate access by a node on the node string network. The configuration of FIG. 10 allows an operator to take an entire node string network off-line for maintenance or repair while the other networks remain functional.

Phone switch 80 is a commercially available device, the most common form being a private branch exchange or PBX. Such devices are manufactured by Northern Telecom, AT&T, and GTE, among others. The phone switch 80 typically is used to pass incoming calls to the next available idle ports of each of the nodes on the network string. This is known as hunt group or line rollover switching.

Phone switch 80 may also be implemented by a so-called intelligent phone switch which recognizes extra information regarding an incoming call if supplied by the phone company central office. By using dialed number identification service (DNIS) or direct inward dialing (DID), the phone switch can determine what number the caller dialed.

Through the use of DNIS or DID, the network system of FIG. 10 can be used for transmitting data of many different services, each service being defined by a particular phone number. In such a multiple service system, each node may be provided with local data storage to contain a subset of all the voice, fax, and processing instruction data stored on the network servers. An incoming call is checked for the number dialed by the intelligent phone switch, which transmits this number to the console 71 via the gateway phone switch 79*d*. The console then determines which voice and processing algorithms the incoming call requires and then routes the call to an idle node having stored therein the appropriate data. If no such idle node exists, the next available idle node may receive the call and retrieve the data from a file server. The retrieved data can be stored locally on the node by discarding the least recently used data.

The phone switch may also determine the number that a caller is calling from, using the automatic number identification (ANI) service. By obtaining such information, billing and account information may be set up and updated for each caller according to his or her phone number.

DESCRIPTION OF OPERATION

The operation of the embodiment of FIGS. 7, 8 and 10 will now be described with reference to the explanatory flow chart diagrams of FIGS. 11 through 18.

Figure 11:
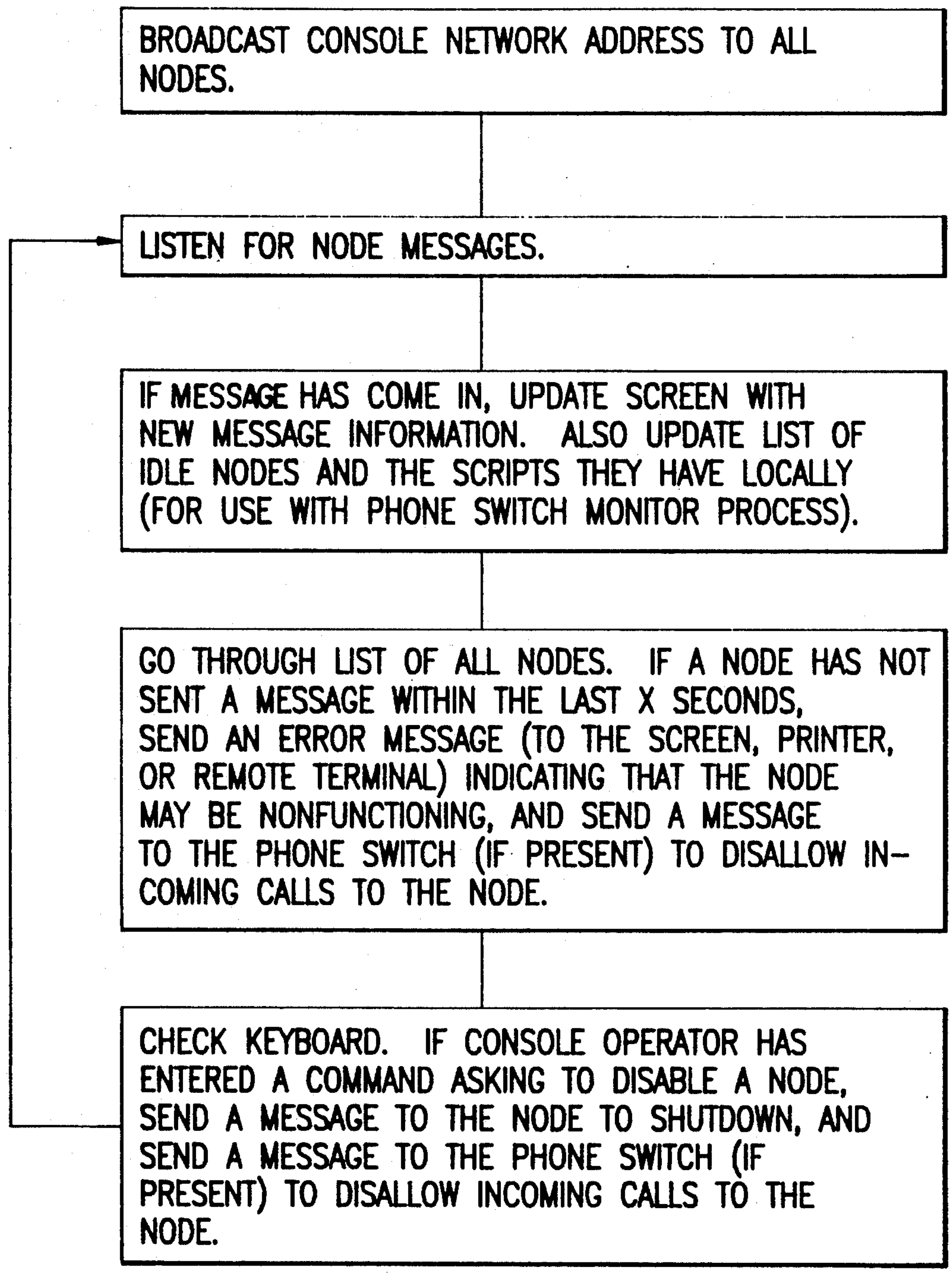

FIG. 11 illustrates a control process algorithm which is executed by the console 71 to monitor each of the nodes on the node string network. The console transmits its network address to each of the nodes on the node string networks, either directly through the node string network as in FIG. 8 or through the control network and servers as illustrated in FIG. 10. In response to the console address transmission, which is performed at system start up, each node transmits various information to the console, as listed in the flow chart of FIG. 12.

When the console has received node message transmissions, the console display is updated with the new information including all idle nodes and the script (control) instructions and data stored locally.

The console then determines whether any node has not sent a message within a predetermined period of time and develops an error message which is communicated to the operator, indicating that the node may be non-functioning, and can also send an instruction to the phone switch 80 to bypass incoming calls away from the malfunctioning node. The console then waits for operator keyboard commands for further node monitoring.

Figure 13:
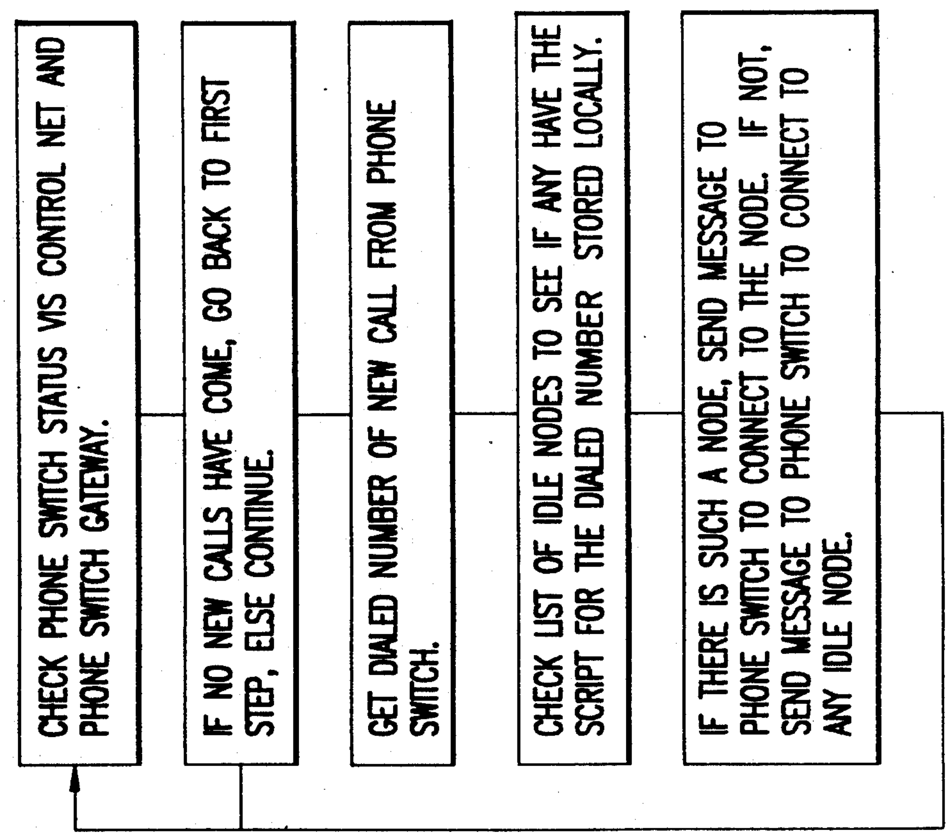

The console also monitors and controls the operation of the phone switch 80 utilizing the algorithm of FIG. 13. In this routine, the phone switch status is periodically checked via the phone switch gateway 79*d* which is coupled to the console through the control network 78. As a call is received by the phone switch 80, the number dialed is obtained by the console through the phone switch.

The console then compares the list of idle nodes with the script, voice and fax data corresponding to the number dialed and determines if any idle nodes can accept the call. If such an idle node is present, the phone switch is instructed to transfer the call to the idle node. If no such node exists, the phone switch is instructed to connect to the first available idle node.

Figures 12, 16:
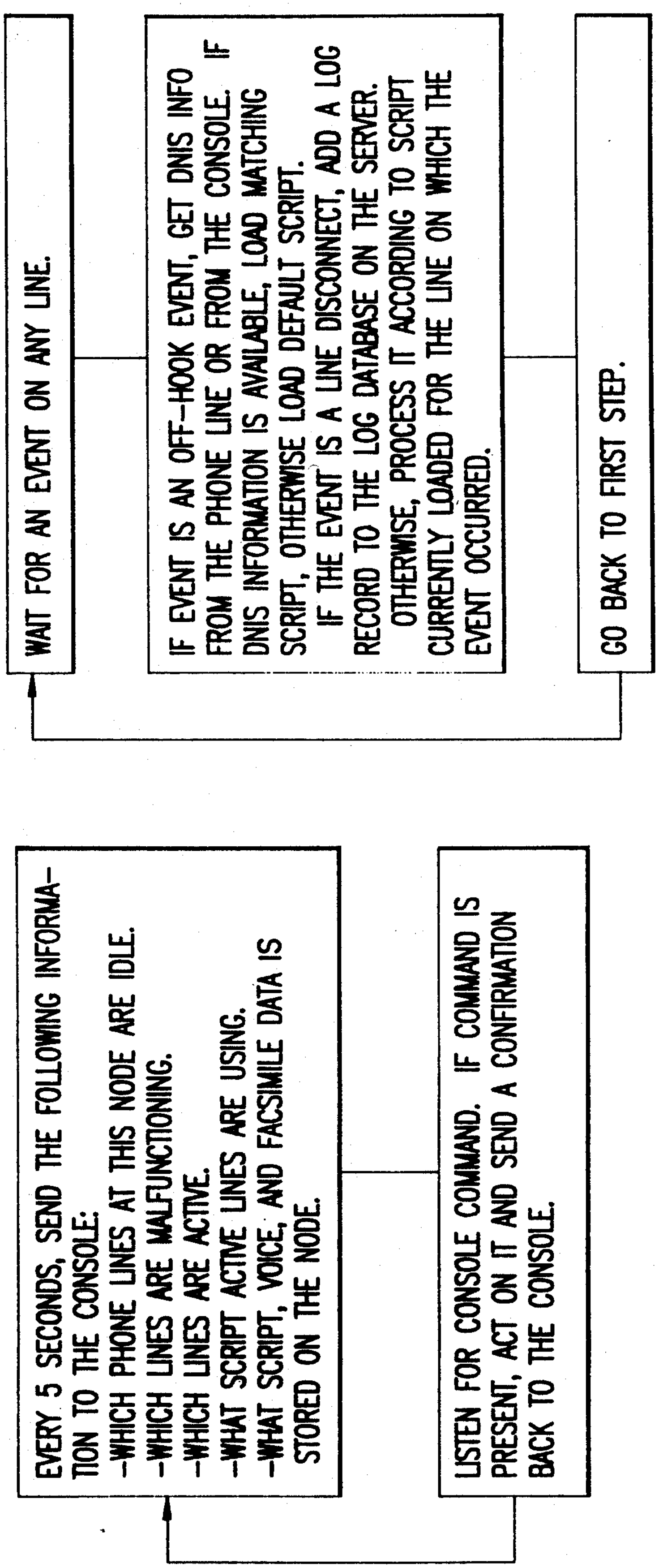

As a call is transferred to an idle node, the call handling algorithm of FIG. 16 processes the call. As the call is received, the dialed number information is retrieved either from the phone line or the console.

Figures 17, 18:
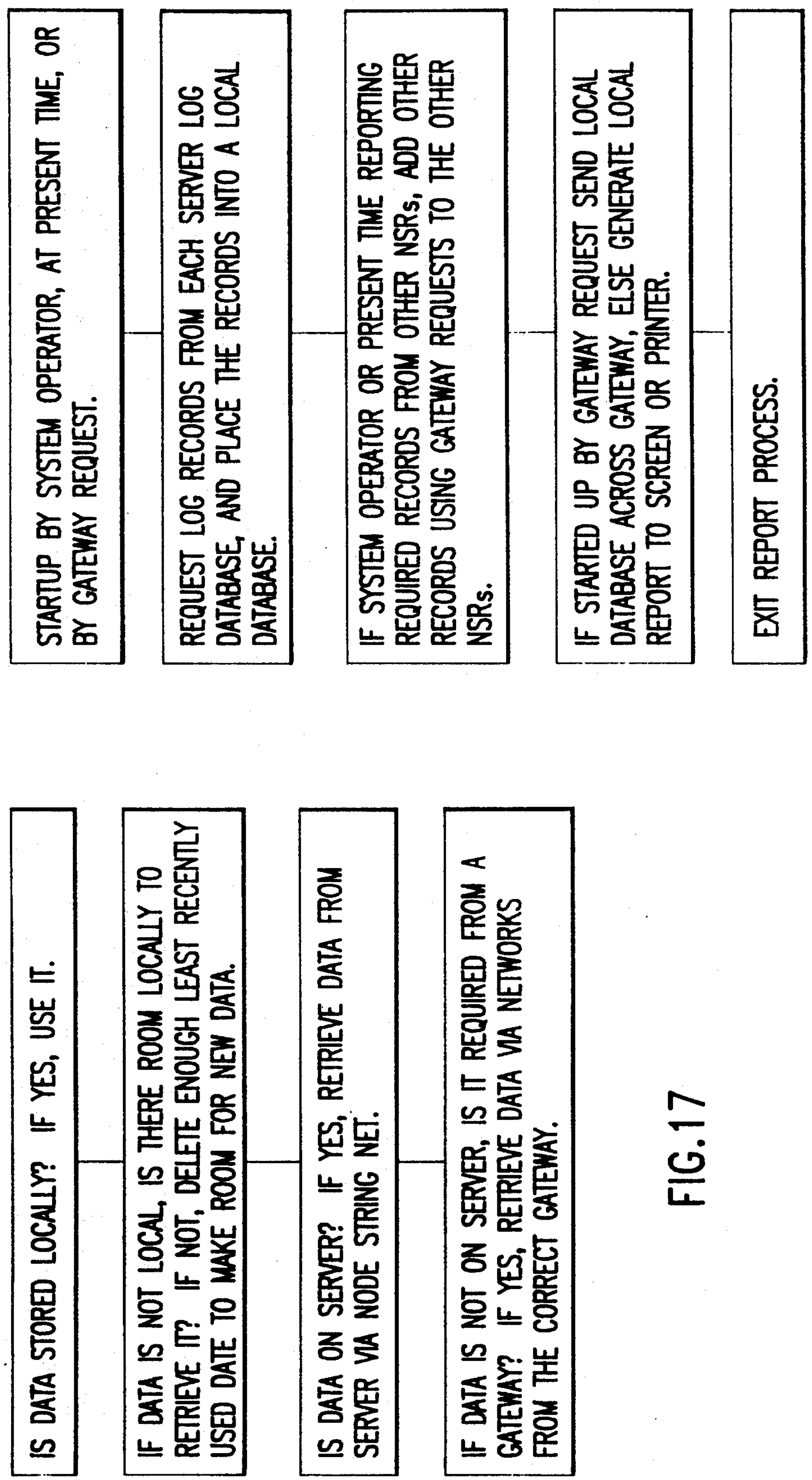

Once the dialed number information is read, the data retrieval algorithm of FIG. 17 determines whether the node has stored locally the required data for the dialed number. If the data is stored, it is used to process the call. If the data is not stored, the node determines whether it contains sufficient memory space to retrieve the data. If sufficient memory is unavailable, the least recently used data is deleted to create sufficient memory space for the new data. The node then determines whether the data required is on a network server or whether the data is required externally through a gateway. Upon ascertaining the proper location of the required data, the node transmits instructions to the appropriate data source to retrieve the data to be stored locally.

Figure 14:
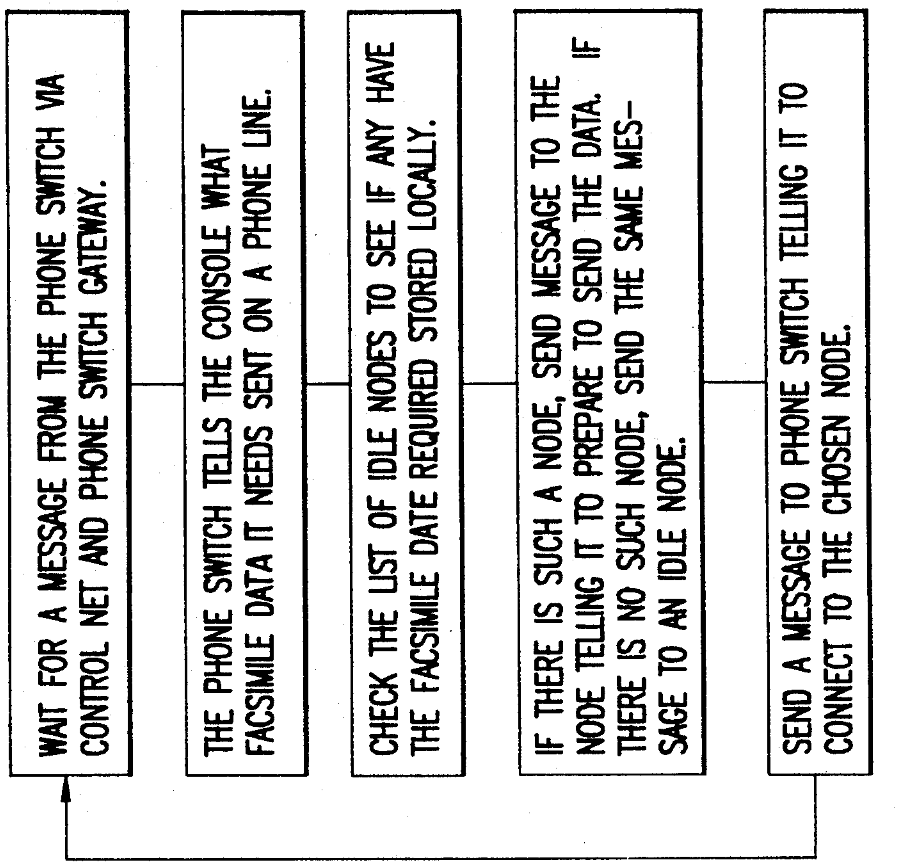

Some commercially available phone switches include the ability to generate voice signals and decode DTMF signals. Thus, such phone switches may be used to handle voice data transmission and determination of specific data requested by a caller. FIG. 14 illustrates a phone switch monitor algorithm which is used by the console to control the operation of such a phone switch. After receiving a signal from the phone switch via the control network, the console receives information regarding which specific facsimile data must be sent out on a phone line. The console then goes through the list of idle nodes to determine if any have the required facsimile data stored locally. If such an idle node exists, the console instructs the node to prepare the data for transmission. If no such node exists, the first available idle node is instructed to retrieve such data according to the algorithm of FIG. 17. After the appropriate node has been so instructed, the console transmits an instruction to the phone switch regarding which node it is to connect to in order to obtain the required data for transmission to the caller.

FIG. 15 illustrates an algorithm for updating the data on the network system from a gateway work station on the control or node string networks. The updating operation can be started from an operator command at the console, by a gateway request, or periodically at specified times. Each server is instructed to create a new data set which is then loaded with the updated information from the console or from a gateway. The old data set remains in place to enable any present calls to be completed. The servers are instructed to replace the old data set with the new data set for all subsequent calls.

The nodes are then instructed to delete all locally stored data after current calls have been completely processed.

After all nodes on the node string have completed their calls, the old data on each server is deleted, thus completing the updating process.

The network system further has the capability to create billing and accounting reports for all transactions performed on the system. Each node maintains log records for each processed call and transmits the log records to a directory on the servers. FIG. 18 illustrates the reporting algorithm used by console to gather the log records from each server. The initiation can be commenced by a system operator, by a gateway request from an external source, or periodically at a preset time. The console requests log records from each server log data base and places the records into a local data base on the console. If the reporting requires records from other network systems, the records are requested using gateway requests. The compiled local data base is then either transmitted over a gateway or reported to a screen or a printer, and the report process is thus completed.

What is claimed is:

1. Apparatus for transmitting graphic and/or textual data requested by a plurality of users to respective facsimile machines of said users over public telephone lines, comprising:
a plurality of nodes interconnected in a node string network configuration, each node including
means for receiving an incoming call from a user over said telephone lines,
voice generation means for generating voice signals over said telephone lines to said user, said voice signals representing instructions informing said user of individual items of data which can be selected by said user for transmission, and instructions informing said user of specific code signals associated with each of said individual items of data,
means for receiving code signals from said user over said telephone lines representing selected items of data,
means for decoding said received code signals to identify said selected items of data,
means for retrieving said identified items of data,
means for transmitting said retrieved data in facsimile form to said user's facsimile machine, and
means for terminating said incoming call after completion of said facsimile transmission;
node string network server means connected to said node string network for storing voice signal data used by said voice generation means, graphic and textual data retrieved by said means for retrieving, and instruction data for controlling the operation of each of said nodes; and
console means interconnected with said plurality of nodes for monitoring the status of each of said nodes, and for identifying and disabling malfunctioning nodes.

2. Apparatus according to claim 1, wherein said node string configuration is a bus topology network configuration.

3. Apparatus according to claim 1, wherein said node string configuration a ring topology network configuration.

4. Apparatus according to claim 1, wherein said node string configuration is a star topology network configuration.

5. Apparatus according to claim 1, wherein said network server means further stores accounting data relative to each user, said accounting data transmitted to said server means from each of said nodes.

6. Apparatus for transmitting graphic and/or textual data requested by a plurality of users to respective facsimile machines of said users over public telephone lines, comprising:
a plurality of node string networks, each including
a plurality of interconnected nodes, each node including
means for receiving an incoming call from a user over said telephone lines,
voice generation means for generating voice signals over said telephone lines to said user, said voice signals representing instructions informing said user of individual items of data which can be selected by said user for transmission, and instructions informing said user of specific code signals associated with each of said individual items of data,
means for receiving code signals from said user over said telephone lines representing selected items of data,
means for decoding said received code signals to identify said selected items of data,
means for retrieving said identified items of data,
means for transmitting said retrieved data in facsimile form to said user's facsimile machine, and
means for terminating said incoming call after completion of said facsimile transmission; and
node string network server means connected to said node string network for storing voice signal data used by said voice generation means, graphic and textual data retrieved by said means for retrieving, and instruction data for controlling the operation of each of said nodes; and
console means interconnected with said plurality of node string network server means through a control network for monitoring the status of each of said nodes, and for identifying and disabling malfunctioning nodes.

7. Apparatus according to claim 6, wherein said network server means further stores accounting data relative to each user, said accounting data transmitted to said server means from each of said nodes.

8. Apparatus according to claim 6, further comprising means coupled to said control network for updating voice signal, graphic and/or textual, and instruction data stored in said node string network server means.

9. Apparatus according to claim 8, wherein said means for updating comprises means for receiving updating data from an external source.

10. Apparatus according to claim 9, wherein said updating data receiving means comprises a modem.

11. Apparatus according to claim 9, wherein said updating data receiving means comprises an interface to an external network.

12. Apparatus according to claim 6, further including phone switch means coupled to said telephone lines for forwarding incoming calls to the receiving means of a selected one of said nodes according to the number dialed by a user and the state of each node.

13. Apparatus according to claim 12, further comprising means for coupling said console means to said phone switch means through said control network for allowing said console means to control the forwarding of specific incoming calls to specific nodes.

* * * * *

UNITED STATES PATENT AND TRADEMARK OFFICE
CERTIFICATE OF CORRECTION

PATENT NO. : 5,136,634

DATED : August 4, 1992

INVENTOR(S) : Rae et al.

It is certified that error appears in the above-identified patent and that said Letters Patent is hereby corrected as shown below:

On the Cover, in the Title, "OPERATED" should be --PROMPTED--, and "MACHINE" should be --DATA RETRIEVED--.

In the Drawings:

Sheet 14 of the drawings, Figure 15, second box down, "DATE" should be --DATA--.

Sheet 15 of the drawings, Figure 17, second box down, "DATE" should be --DATA--.

Signed and Sealed this

Second Day of November, 1993

*Attest:*

BRUCE LEHMAN

*Attesting Officer* — *Commissioner of Patents and Trademarks*